United States Patent
Eliav et al.

(10) Patent No.: US 10,455,857 B2
(45) Date of Patent: Oct. 29, 2019

(54) METHOD FOR APPLYING A DESIGN TO A FOOD SUBSTRATE

(71) Applicants: Eyal Eliav, Tel Aviv (IL); Danny Lavie, Ramet Hasharon (IL); Shlomo Magdassi, Jerusalem (IL)

(72) Inventors: Eyal Eliav, Tel Aviv (IL); Danny Lavie, Ramet Hasharon (IL); Shlomo Magdassi, Jerusalem (IL)

(73) Assignees: Ripples Ltd., Petach Tikva (IL); Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 14/509,080

(22) Filed: Oct. 8, 2014

(65) Prior Publication Data

US 2015/0147444 A1 May 28, 2015

Related U.S. Application Data

(63) Continuation of application No. 12/311,840, filed as application No. PCT/IL2007/001229 on Oct. 15, 2007, now abandoned.

(30) Foreign Application Priority Data

Oct. 15, 2006 (IL) .......................................... 178519

(51) Int. Cl.
| | | |
|---|---|---|
| *A23P 20/18* | (2016.01) | |
| *C09B 61/00* | (2006.01) | |
| *C09B 67/44* | (2006.01) | |
| *C09D 11/32* | (2014.01) | |
| *A23L 5/43* | (2016.01) | |

(52) U.S. Cl.
CPC ................. *A23P 20/18* (2016.08); *A23L 5/43* (2016.08); *C09B 61/00* (2013.01); *C09B 67/0083* (2013.01); *C09D 11/32* (2013.01); *A23V 2002/00* (2013.01)

(58) Field of Classification Search
CPC ........... A23P 20/15; A23P 20/18; C09D 11/32
See application file for complete search history.

(56) References Cited

U.S. PATENT DOCUMENTS

| | | | | |
|---|---|---|---|---|
| 6,058,843 | A * | 5/2000 | Young ....................... | B41J 2/01 101/483 |
| 6,110,474 | A * | 8/2000 | Roman ..................... | A61K 8/97 132/320 |
| 6,926,766 | B2 * | 8/2005 | Pistagna ................ | C09D 11/38 106/31.58 |
| 2005/0003055 | A1 * | 1/2005 | Baydo ................ | A21D 13/0087 426/383 |

FOREIGN PATENT DOCUMENTS

WO   WO 2004003089 A1 *   1/2004   ......... A21D 13/0087

OTHER PUBLICATIONS

Schomer, David "Latte Art 101". Available online as of Dec. 1994 from "Coffee Talk". pp. 1-2.*
"Polyoxyethylene sorbitan oleate". Available online as of Mar. 14, 2016. Chemicalland21.com. p. 1.*

* cited by examiner

*Primary Examiner* — Jenna A Watts
(74) *Attorney, Agent, or Firm* — Marc Van Dyke; Fourth Dimension IP

(57) ABSTRACT

The present invention provides a liquid coloring composition comprising of a coffee solution or coffee extract and an ink vehicle. The coloring composition is suitable for use as an ink in a non-impact printing device, including an ink jet type printer. The composition is composed of edible components. The invention further provides a process for applying a design to a food substrate, comprising of providing a non-impact printing device, wherein the ink cartridge or external container contains the coloring composition of the invention.

10 Claims, No Drawings

METHOD FOR APPLYING A DESIGN TO A FOOD SUBSTRATE

CROSS-REFERENCE TO RELATED APPLICATIONS

PCT/IL2007/001229 which was filed on Oct. 15, 2007, and which published as WO/2008/04734, is incorporated herein by reference in its entirety.

FIELD OF THE INVENTION

The present invention relates to the field of food stuff, particularly to edible coloring compositions.

BACKGROUND OF THE INVENTION

With the rise in popularity of coffee drinking, particularly coffee drinks such as cappuccino, café au lait and other premium coffee drinks, the practice of decorating the top surface of the frothed milk has also developed. The most widely practiced technique of decorating the foamed milk is known as "latte art". Latte art refers to the technique of using a coffee solution to trace a design on the surface of foamed milk, wherein usually said foamed milk is in a coffee drink such as café au lait, cappuccino or the like. The designs created in the foamed milk can be of a wide array of possibilities e.g., drawings, images and writing. A number of publications suggest the use of ink jet, bubble jet or other known printers for printing with food coloring onto edible substrates, e.g. U.S. Pat. Nos. 6,058,843, 6,536,345, U.S. Patent Application Publication No. 2005/0157148 (Baker et al). Inks for use on edible substrates have also been described in the prior art. U.S. Pat. No. 5,800,601 (Zou et al) teaches of a food grade jet ink containing resin. U.S. Pat. No. 6,652,897 (Stewart), U.S. Pat. No. 5,397,387 (Deng et al) and U.S. Pat. No. 5,637,139 (Morelos et al).

However, the prior art publications teach of the use of food colorants which are primarily aimed for use on edible substrates which are solids, gels or of high viscosity so that the food colorant (edible ink) may be fixed to the substrate. Furthermore, the prior art inks contain ingredients which are not completely safe for consumption or may impart a flavor which is undesirable, for example in beverages such as coffee. Examples of such ingredients include organic solvents, e.g., ethanol, iso-propanol, n-butanol and acetate esters.

Thus, there is a long felt need for an edible ink or coloring composition which does not contain ingredients which may be unsafe for consumption and may impart undesirable properties to the food stuff on which they are applied, such as undesirable taste or texture, while also suitable for use with non-impact printing technologies, e.g., bubble jet or ink jet technology.

It is therefore an objective of the present invention to provide an edible coloring composition which does not have the disadvantages of the prior art inks and compositions and is suitable for use with non-impact printing technologies, including ink jet technology.

Other objectives of the invention shall become apparent as the description proceeds.

SUMMARY OF THE INVENTION

The present invention provides a liquid coloring composition comprising of a coffee solution or coffee extract and an ink vehicle, wherein said coloring composition is suitable for use as an ink in non-impact printing technologies, including ink jet type printers. Optionally, said composition comprises one or more of the following: humectants, rheology controlling agents, wetting agents, antioxidants, pH adjusting agents, foam control agents, antimicrobial agents, and natural or artificial colorants, fixation agents or mixtures thereof.

Further provided by the present invention is a process for applying a design to a food substrate comprising of providing a non-impact printing device wherein the ink cartridge or external container contains a coloring composition of the present. invention and applying said coloring composition from said printing device to the food substrate in accordance to the pattern of the desired design.

A liquid coloring composition comprises a coffee solution or coffee extract and an ink vehicle, wherein said coloring composition is suitable for use as an ink in a nonimpact printing device, including an ink jet type printer and is composed of edible components.

In some embodiments, said composition comprises one or more of the following: humectants, rheology controlling agents, wetting agents, antioxidants, pH adjusting agents, foam control agents, antimicrobial agents, and natural or artificial colorants, fixation agents or mixtures thereof.

In some embodiments, said vehicle is water and one or more of the following: humectants, rheology controlling agents, wetting agents, dispersants, antioxidants, pH adjusting agents, foam control agents, antimicrobial agents, and natural or artificial colorants, fixation agents or mixtures thereof.

In some embodiments, said coffee solution is the primary color imparting agent of the ink.

In some embodiments, the vehicle contains 3% to 30% by weight of coffee solution.

In some embodiments, said coffee solution in the liquid ink vehicle is obtained from ground coffee beans, by extraction.

In some embodiments, said coffee beans can be from various blends of coffee beans according to the desired flavor and coloring hue.

In some embodiments, said coffee ink preferably contains coffee components that are soluble in water or in the liquid vehicles.

In some embodiments, the coffee components are in the form of submicron particles obtained from the coffee beans.

In some embodiments, the ingredients in said ink are selected from Generally Recognized as Safe (GRAS) ingredients or edible ingredients.

In some embodiments, said humectants suitable for the present coffee ink are selected from a group comprising glycerol, propylene glycol, polyethylene glycol 200, polyethylene glycol 400, polyethylene glycol 600, or mixtures thereof.

In some embodiments, said rheology control agents are selected from a group comprising polyssacharides such as arabinogalactans, guar gum, locust bean gum, xanthan gum, arabic gum, karaya gum, tragacanth gum, alginate gums, from proteins such as whey proteins BSA, beta-lactalbumin, beta-lactoglobulin, casein, seed proteins; cellulose ethers such as methylcellulose, ethylcellulose, hydroxyethylcellulose, hydroxypropylcellulose, and hydroxypropyl methylcellulose; and cellulose carboxylates such as sodium carboxymethylcellulose, and mixtures thereof.

In some embodiments, said pH adjusting agent, acid or base, is applied to maintain the pH of the ink composition in the range of from about 4.5 to about 10.0, preferably in the range of from about 5.0 to about 7.0.

In some embodiments, said bases are selected from a group comprising ammonium hydroxide, sodium hydroxide, potassium hydroxide, sodium bicarbonate, potassium bicarbonate, and ammonium bicarbonate and acids are selected from a group comprising edible acids such as citric acid, ascorbic acid, malic acid and fumaric acid.

In some embodiments, said pH adjusting agent is used in an amount ranging from about 0.0001% by weight to about 1.0% by weight of the ink composition.

In some embodiments, said antimicrobial agents (biocides) are selected from a group comprising benzoate salts, sorbate salts, and the like, preferably potassium sorbate; and methyl p-hydroxybenzoate (methyl paraben).

In some embodiments, said wetting agents are selected from a group comprising ethoxylated sorbitan monooleate (Tween 80), ethoxylated sorbitan mono stearate (Tween 60), lecithin, (e.g., epikuron 200) phosphatidylcholine or lysophosphatidylcholine, polyglycerol esters or mixtures thereof.

In some embodiments, comprising 0.001 to 1.0% by weight of said wetting agent.

In some embodiments, comprising colorants selected from a group comprising edible dyestuffs; caramel (E 150) ,E-151 (CI food black 1), E-131, E 132 (CI blue 5, CI blue 1).

In some embodiments, comprising 0.1-3% of a fixation agent selected from a group comprising edible polymers including polysaccharides: arabinogalactans, guar gum, carboxy methyl cellulose,propylene alginate locust bean gum, xanthan gum, arabic gum, karaya gum, tragacanth gum, alginate gums, and proteins: soybean or whey proteins ,BSA, beta-lactalbumin, beta-lactoglobulin and casein or mixtures thereof.

A process for applying a design to a food substrate comprises providing a non-impact printing device wherein the ink cartridge or external container contains a coloring composition of claim 1, and applying said coloring composition from said printing device to the food substrate in accordance to the pattern of the desired design.

In some embodiments, said printing device is selected from a group comprising of bubble jet printers, piezo jet printers, and conventional plotters.

In some embodiments, said food stuff are edible food stuff which can be in the form of foam, liquid, solid or whipped.

In some embodiments, said food stuff is a coffee beverage.

In some embodiments, said coffee beverage is selected from a group comprising cappuccino, cafe au lait, espresso and other coffee beverages with frothed milk or cream on top.

In some embodiments, said food stuff is a liquid ice cream product or a milk shake.

DETAILED DESCRIPTION OF PREFERRED EMBODIMENTS

The following description is illustrative of embodiments of the invention. The following description is not to be construed as limiting, it being understood that the skilled person may carry out many obvious variations to the invention.

The present invention provides a liquid coloring composition, also referred throughout the specification as "coffee ink", comprising solely of edible ingredients preferably, which are GRAS (Generally Recognized As Safe) ingredients. The present coloring composition does not contain organic solvents such as ethanol, iso-propanol, n-butanol, acetate esters or the like, and provides all the properties necessary for an ink which is suitable for printing onto food substrates. Food substrates according to the present invention are any edible food stuff which can be in the form of foam, liquid, solid or whipped. Said coffee ink is further characterized in that it possesses the physical properties of ink suitable for non-impact printing devices such as ink jet printers, e.g., stability, surface tension, viscosity, particle size. Hence, the present coffee ink is a unique combination of properties from the fields of food technology and color printing technologies which enable the coffee ink to provide satisfactory results in printing on food substrates while remaining safely edible.

Throughout the specification the term "coffee solution" refers to any liquid solution of coffee or coffee extract suitable for the purposes of the present invention. Furthermore, the term "design" also encompasses image, drawing, outline, letter, word, logo, sign, written message and combinations thereof. Percentages of components throughout the description refer to weight by weight, unless explicitly mentioned otherwise.

Further provided by the present invention is a process for applying a design to a food substrate comprising of providing a non-impact printing device including inter alia an ink jet printer wherein the ink cartridge contains a coloring composition of the present invention and applying said coloring composition from said printing device to the food substrate in accordance to the pattern of the desired design.

The presently claimed coloring composition and process are particularly suitable for applying to the surface of foamed milk or whipped food stuff. According to a particular embodiment of the invention the present coffee. ink (also referred to throughout the description as "ink") is applied to coffee beverages wherein said beverages may optionally be topped with frothed milk.

According to the present invention, the coffee ink comprises a coffee solution and an ink vehicle, wherein according to a preferred embodiment said ink vehicle is water. Said coffee solution functions as the primary color imparting agent of the coffee ink. According to a particular embodiment the vehicle contains 3% to 30% by weight of coffee solution. According to one particular embodiment, the coffee solution in the liquid ink vehicle is obtained from ground coffee beans (roasted to variable degrees), by extraction. Said coffee beans can be from various blends of coffee beans according to the desired flavor and coloring hue. The coffee ink preferably contains coffee components that are soluble in water or in the liquid vehicles, although said coffee components can also be in the form of submicron particles obtained from the coffee beans, by grinding or other methods known to the skilled artisan.

According to a further embodiment of the present invention, said coffee ink further comprises one or more of the following: humectants, rheology controlling agents, wetting agents, antioxidants, pH adjusting agents, foam control agents, antimicrobial agents, and natural or artificial colorants, fixation agents or mixtures thereof. The ingredients in said ink are selected from Generally Recognized as Safe (GRAS) ingredients. Unless specifically mentioned otherwise, all percentages of ingredients are weight by weight.

The coloring composition (coffee ink) of the present invention is prepared using a suitable ink vehicle, which is mainly water, without solvents such as ethanol, iso-propanol and n-butanol.

Non-limiting examples of humectants suitable for the present coffee ink may be selected from the following: glycerol GRAS, propylene glycol, Propylene glycol —MISC, GRAS/FS—184.1666; Part 169 (169.175, 169.176, 169.177, 169.178, 169.180, 169.181), Vanilla Extract; Carrier for enzyme modified soy protein; polyethylene glycol 200, polyethylene glycol 400, polyethylene glycol 600, or mixtures thereof.

The role of the humectants is to prevent fast drying of the ink on the printer head during and in between printings, and they may also function for increasing the viscosity of said ink, reduce surface tension, and enhance the solubility of various components of said ink.

Rheology control agents are intended to provide temporary fixation on to the surface of the coffee drink. Said agents may be either present naturally in the coffee extracts which are part of the ink, or may be added to the vehicle. Non-limiting examples of suitable rheology controlling agents include: natural polyssacharides such as arabinogalactans, guar gum, locust bean gum, xanthan gum, arabic gum, karaya gum, tragacanth gum, alginate gums, from proteins such as whey proteins BSA, beta-lactalbumin, beta-lactoglobulin, casein, seed proteins; cellulose ethers such as methylcellulose, ethylcellulose, hydroxyethylcellulose, hydroxypropylcellulose, and hydroxypropyl methylcellulose; and cellulose carboxylates such as sodium carboxymethylcellulose, and mixtures thereof. Non-limiting specific examples of rheology control agents are: Methylcellulose (USP methylcellulose) —MISC, GRAS/FS, Except methoxy content—27.5 & 31.5% dr wt basis—182.1480; Part 150 (150.141, 150.161), Fruit Butters, Jellies;

Ethyl cellulose—MISC, REG, GMP, As binder or filler in dry vitamin prepns or component of protective ctg for vit & min tabs, or as fixative in flavor compounds—172.868; 573.420;

Carboxymethylcellulose—STAB, FS, Part 133, Cheeses; Part 135, Frozen Desserts; Part 169, Dressings for Foods & Flavorings; GRAS Hydroxypropyl cellulose—MISC, REG, GMP, EMUL, STAB—172.870

Hydroxypropyl methylcellulose—EMUL, REG/FS, GMP—172.874; Part 169, Dressings; Part 135, Fr Desserts The coffee ink composition of the present invention may further comprise pH adjusting agents. Any suitable pH adjusting agent, acid or base, can be used so as to maintain the pH of the ink composition in the range of from about 4.5 to about 10.0, preferably in the range of from about 5.0 to about 9.0. If a base is necessary, any suitable base can be used. Non-limiting examples of suitable bases include ammonium hydroxide, sodium hydroxide, potassium hydroxide, sodium bicarbonate, potassium bicarbonate, and ammonium bicarbonate. Any suitable amount of the pH adjusting agent can be used. According to a particular embodiment of the invention, the pH adjusting agent can be added at low amounts, i.e., at the acceptable levels for food applications. Non-limiting examples of suitable acids to be used as pH adjusting agents include edible acids such as citric acid, ascorbic acid, malic acid and fumaric acid. Said pH adjusting agent is used preferably in an amount ranging from about 0.01% by weight to about 1.0% by weight of the ink composition. The selection of pH adjusting agent and amount thereof, depends on the required adjustment of the pH. Said selection is within the scope of knowledge of the skilled artisan.

The coffee ink composition of the present invention may optionally further contain suitable antimicrobial agents also known as biocides, to prevent growth of bacteria, mould or fungus, particularly since water is present in the ink composition. Any suitable antimicrobial agent can be used as may be appreciate by the skilled artisan. Non-limiting examples of said antimicrobial agents include, benzoate salts, sorbate salts, and the like, preferably potassium sorbate; and methyl p-hydroxybenzoate (methyl paraben). The coffee ink may contain up to 0.3% of antimicrobial agent.

The coffee ink of the present invention may further be sterilized by thermal processes or filtration methods known to the skilled person in the art.

Suitable defoamers to prevent excessive foaming of the coffee ink during its preparation, as well as during the printing operation may be employed. Any suitable food grade defoamer known to those of ordinary skill in the art can be used. Suitable amounts effective to prevent foaming of the coffee ink during preparation and use (printing), preferably an amount in the range of from about 0.01% by weight to about 1% by weight of said ink composition, and more preferably in the range of from about 0.05% by weight to about 0.35% by weight of the ink composition. The foaming agent is selected so that that it will not interfere with the quality of the printed image and the coffee drink properties.

wetting agents suitable for use in the present invention are preferably edible surfactants. Non-limiting examples of said wetting agents include ethoxylated sorbitan monooleate (Tween 80, Tween 60), lecithin, phosphatidylcholine (e.g., epikuron 200) or lysophosphatidylcholine, polyglycerol esters or mixtures thereof. Said surfactant is preferably present in an amount of 0.05 to 1.0% by weight.

In some coloring compositions of the present invention, coloring agents may be added to the coffee solution to obtain the desired color properties such as color gamut and optical density of the final ink. Non-limiting examples of suitable edible dyestuffs are natural colorants such as caramel (E 150) E-151 (CI food black 1), E-131, E 132 (CI blue 5, CI blue 1)

In cases where the printed image is not sufficiently fixed on the surface, a "fixation agent" may be added. According to a specific non-limiting embodiment, said fixation agents are edible polymers ,e.g. polysaccharides and proteins, that should be added to the ink at concentration range of 0.1-3%, according to the required changes in rheology upon contact with the liquid which it is being printed on. Examples for such fixation agents are polyssacharides such as arabinogalactans, guar gum, carboxy methyl cellulose, propylene alginate locust bean gum, xanthan gum, arabic gum, karaya gum, tragacanth gum, alginate gums, from proteins such as soybean or whey proteins ,BSA, beta-lactalbumin, beta-lactoglobulin, casein.

Examples for fixation agents which upon contact with the food stuff react to create a fixating effect are: 1) A liquid which has low viscosity at the pH of the liquid which is printed, and upon contact with the foodstuff which have a different pH, becomes more viscous. 2) A liquid which contains sodium alginate, which upon contact with the liquid foodstuff meets calcium ions (usually present in drinking water) precipitates, and causes fixation of the colorant.

A primary unique feature of the coffee ink of the present invention is also its compatibility with commercial ink jet and bubble jet printer heads. The coffee ink of the present invention is compatible with a variety of "non impact printing" devices, e.g., Piezoelectric or bubble jet printheads. Throughout the description wherein the terms "bubble jet" and/or "ink jet" are used it is intended to also relate to all types of non-impact printing technologies and devices.

According to a particular embodiment of the present invention non-impact printing devices and ink jet printers suitable for the present invention include ink jet printers, bubble jet printers and other jet printing devices.

In yet a further embodiment of the present invention the designs created may be designs which contain various intensities of the brown color of the coffee ink in order to enable to create extremely intricate designs with a broad spectrum of intensity. Controlling the intensity may be done in accordance to the methods employed in ink jet printers or in accordance to other color-intensity-control methods known to the skilled artisan.

EXAMPLES

Example 1

Coffee concentrate was prepared as follows: First, ground coffee beans were dispersed in boiling water for 1 hour and filtered through Whatman-41 filter paper. The filtered aqueous suspension was mixed with an excess of ethanol to precipitate the natural polysaccharide which is present in the beans (in order to reduce the viscosity to be suitable to simple office inkjet printer). After centrifugation, 0.1 wt % potassium sorbate (antimicrobial agent) was added to the supernatant, which was then concentrated under reduced pressure until a 15-20 wt % solid content coffee extract is obtained. Ink jet composition is described in Table-1. The ink was 0.45 micro meter filtered and could be printed with a Lexmark Z615 printer. Viscosity of the ink was 2.9 cPs.

TABLE 1

| Sample No. Ax-1990-10 | wt % |
| --- | --- |
| Coffee concentrate (Regavim Espresso concentrate) | 89.9 |
| Propylene glycol | 5 |
| Glycerol | 5 |
| Tween 80 | 0.1 |

Example 2

Coffee concentrate was prepared as in example 1. Ink jet composition is described in Table-2. The ink was 0.45 micro meter filtered and could be printed with a Lexmark Z615 printer. Viscosity of the ink (including caramel coloring) was 3.0. cPs.

TABLE 2

| Ax-1990-30 | wt % |
| --- | --- |
| "Regavim" Espresso concentrate | 79.9 |
| Caramel color 050 concentrate* | 10 |
| Propylene glycol | 5 |
| Glycerol | 5 |
| Tween 80 | 0.1 |

*Caramel color 050 concentrate is a commercial product- Caramel color no. 50 Class IV, from D. D. Williamson Example 3

Coffee concentrate obtained as a commercial espresso beverage was prepared as in Example 1 wherein additionally part of the polysaccharides from the precipitate were added to increase viscosity. Ink jet composition is described in Table-3. The ink was 0.45 micro meter filtered and could be printed with a Lexmark Z615 printer. Viscosity of the ink was 5.5 cPs. However, this time the viscosity of the ink was increased by adding the rheological agents which are naturally present in the coffee, and which are precipitated by the ethanolic solution.

TABLE 3

| Ax-2010-50 | wt % |
| --- | --- |
| "commercial espresso" concentrate | 79.4 |
| Ethanolic precipitate (gum) | 0.5 |
| Caramel | 10 |
| Propylene glycol | 5 |
| Glycerol | 5 |
| Tween 80 | 0.1 |

Example 4

Coffee concentrate was prepared in the following manner: First, ground coffee beans were cooked in boiling water for 1 hour and filtered through Whatman-41 filter paper. 0.1 wt % potassium sorbate (antimicrobial agent) was added to the supernatant and concentrated under reduced pressure until a 15-20 wt % solid content coffee extract is obtained. The concentrate was lyophilized to a powder form. Ink jet composition is described in Table-4. The ink was 0.45 micro meter filtered and could be printed with a Lexmark Z615 printer. Viscosity of the ink was 3.2 cPs.

TABLE 4

| Ax-1969-41 | wt % |
| --- | --- |
| Lyophilized Elite ® espresso concentrate (described above) | 15 |
| Propylene glycol | 5 |
| Glycerol | — |
| Tween 80 | 0.1 |
| Water | 79.9 |

Note: All coffee inks in the Examples were printed successfully directly on coffee covered by a foamed milk, by using a Lexmark inkjet printer, which was converted in such a away to allow direct printing on cup of coffee.

A similar procedure was applied, while the step of precipitation of the polysaccharides was omitted, thus the resulting coffee extract contains all the water soluble components, including the natural polymers. The resulting inks which were prepared according to compositions described in the tables above, had a viscosity higher than 3 cPs. Therefore, for these inks printing with an office printer was possible, but after prolonged use clogging of the printer head may occur. To overcome this, the usual maintenance operation for the printhead is performed. Said inks are also suitable for printing with industrial print heads, which are capable of printing at high viscosity, such as Spectra print heads, Xaar print heads and Richo print heads. With such printheads clogging is not expected to occur.

The following specific examples are of ink compositions in which the coffee extract was obtained without precipitation of polymeric components (such as polysaccharides):

Example 5

Coffee ink jet ink was prepared as follow. First, ground coffee beans were cooked in boiling water for 1 hour and filtered through Whatman-41 filter paper. The filtered aqueous suspension was centrifuged and 0.1 wt % potassium sorbate (antimicrobial agent) was added to the supernatant. The supernatant was concentrated by heating (60-70° C.) at atmospheric pressure until a 15-20 wt % solid content coffee extract is obtained. Ink jet ink composition is described in Table-5. The ink was 0.45 micro meter filtered and could be printed with a Lexmark Z615 printer. Viscosity of the ink was 4.5 cPs.

TABLE 5

| Ax-1969-1 | wt % |
|---|---|
| Elite ® espresso extract | 89.9 |
| Glycerol | 10 |
| Tween 80 | 0.1 |

Example 6

Coffee extract was prepared as in example 5. Inkjet composition is described in Table-6. The ink was 0.45 micrometer filtered and could be printed with a Lexmark Z615 printer. Viscosity of the ink was 4.0 cPs.

TABLE 6

| Ax-1969-4 | wt % |
|---|---|
| Elite ® espresso extract | 79.9 |
| Propylene glycol | 5 |
| Glycerol | 5 |
| Tween 80 | 0.1 |

Example 7

Coffee extract was prepared as in example 5 while using "Elite® instant coffee" extract. Ink jet ink composition is described in Table-7. The ink was 0.45 micrometer filtered and could be printed with a Lexmark Z615 printer. Viscosity of the ink was 4.0 cPs.

TABLE 7

| Ax-1969-10 | wt % |
|---|---|
| Elite ® instant coffee extract | 79.9 |
| Propylene glycol | 5 |
| Glycerol | 5 |
| Tween 80 | 0.1 |

Example 8

An ink was prepared by mixing red food colorant with water and 15% propylene glycol, together with preservative (0.1 wt % potassium sorbate) and a surfactant (0.1% Tween 80, or lecithine). The ink was printed on a freshly prepared milk-shake (contained in a glass), resulting in obtaining required patterns on the surface of the drink. In cases where the printed image was not sufficiently fixed on the surface, a "fixation agent" was added. Such agents are edible polymers ,e.g. polysaccharides and proteins.

While embodiments of the invention have been described by way of illustration, it will be apparent that the invention may be carried out with many modifications, variations and adaptations, without departing from its spirit or exceeding the scope of the claims.

It should be understood that some modification, alteration and substitution is anticipated and expected from those skilled in the art without departing from the teachings of the invention. Accordingly, it is appropriate that the following claims be construed broadly and in a manner consistent with the scope and spirit of the invention.

The invention claimed is:

1. A method for applying a design to a food substrate comprising:
   a. providing an aqueous liquid-phase ink-composition comprising a coffee extract having a viscosity between 2.9 cPs and 5.5 cPs, the liquid-phase ink comprising submicron coffee particles and lacking coffee particles having a diameter exceeding 0.45 microns, wherein the coffee extract is the primary color imparting agent of the aqueous liquid-phase ink-composition wherein the aqueous liquid-phase ink-composition has between 3% and 30% by weight solid component of the coffee extract; and
   b. employing a bubble-jet printer to ink-jet the aqueous liquid-phase ink-composition onto the food substrate according to a pattern of the desired design.

2. The method of claim 1 wherein said liquid-phase ink composition comprises one or more of the following: humectants, rheology controlling agents, wetting agents, antioxidants, pH adjusting agents, acids, base, foam control agents, antimicrobial agents, and natural or artificial colorants, fixation agents or mixtures thereof.

3. The method of claim 1 wherein said liquid-phase ink-composition comprises solely edible ingredients which are Generally Recognized as Safe (GRAS).

4. The method according to claim 2 wherein said pH adjusting agent is used in an amount ranging from about 0.0001% by weight to about 1.0% by weight of the liquid-phase ink composition.

5. The method of claim 1, wherein the aqueous liquid-phase ink-composition has between 15% and 20% by weight solid component of the coffee extract.

6. The method of claim 5, wherein the liquid-phase ink-composition is free of ethanol, iso-propanol and n-butanol.

7. The method of claim 1 wherein the food substrate is a coffee beverage.

8. The method of claim 7 wherein an upper surface of the coffee beverage, to which the design is ink-jetted by the bubble-jet printer, is foamed milk or frothed milk.

9. The method of claim 2 wherein said pH adjusting agent, acid or base, is applied to maintain the pH of the ink composition in the range of from about 5 to about 7.

10. A method for applying a design to a foamed beverage comprising:
   a. providing an aqueous liquid-phase ink-composition comprising a coffee and having a viscosity between 2.9 cPs and 5.5 cPs, the liquid-phase ink comprising submicron coffee particles and lacking coffee particles having a diameter exceeding 0.45 microns, wherein the coffee extract is the primary color imparting agent of the aqueous liquid-phase ink-composition wherein the aqueous liquid-phase ink-phase composition has between 15% and 20% by weight solid component of the coffee extract; and
   b. employing a bubble-jet printer to ink-jet the aqueous liquid-phase ink-composition onto the foamed beverage according to a pattern of the desired design.

* * * * *